United States Patent [19]

Ewertowski

[11] 4,291,797
[45] Sep. 29, 1981

[54] PALLET CHANGER FOR A MANUFACTURE PLANT

[75] Inventor: Norbert Ewertowski, Dietzenbach-Steinberg, Fed. Rep. of Germany

[73] Assignee: Werkzeugmaschinenfabrik Oerlikon-Bührle AG, Zurich, Switzerland

[21] Appl. No.: 107,330

[22] Filed: Dec. 26, 1979

Related U.S. Application Data

[63] Continuation of Ser. No. 867,968, Jan. 9, 1978, abandoned.

[30] Foreign Application Priority Data

Jan. 17, 1977 [CH] Switzerland .......................... 511/77

[51] Int. Cl.³ ............................................. B65G 37/00
[52] U.S. Cl. .................................. 198/472; 198/349; 29/33 P; 104/35; 104/88
[58] Field of Search .................... 198/339–341, 198/349, 350, 362, 366, 370, 372, 414, 472, 480, 803, 365; 104/35, 88; 29/33 P, 563; 414/134, 259, 263, 280

[56] References Cited

U.S. PATENT DOCUMENTS

| | | | |
|---|---|---|---|
| 3,055,517 | 9/1962 | Kirkland | 414/259 |
| 3,530,571 | 9/1970 | Perry | 198/349 |
| 3,659,729 | 5/1972 | Lamkemeyer | 198/803 |
| 3,670,464 | 6/1972 | Cutter | 414/263 |
| 3,825,245 | 7/1974 | Osburn et al. | 198/472 |

FOREIGN PATENT DOCUMENTS 2162133  6/1973  Fed. Rep. of Germany ...... 198/372

Primary Examiner—Joseph E. Valenza
Attorney, Agent, or Firm—Werner W. Kleeman

[57] ABSTRACT

A pallet changer having additional distribution and storage functions for a manufacturing plant having a central control station, transfer stations at the conveying and storage part of the installation and address readers. The pallet changer comprises a rotatable part capable of rotating about a vertical axis and having pallet guides and pallet feed devices for pallets equipped with switching markers. The rotatable part can be rotated into four fixed change positions offset by about 90° with respect to one another for changing the pallets at one, two or three transfer stations and at one or two machine tools. Rotation of the rotatable part is accomplished as a function of programmes infed to the central control station and by means of four non-rotatably arranged address readers dispositioned at a spacing of about 90° from one another and with the same spacing from the axis of rotation. The address readers are activated by the address switching markers of the pallets inserted onto the pallet guides.

16 Claims, 11 Drawing Figures

PALLET CHANGER FOR A MANUFACTURE PLANT

CROSS REFERENCE TO RELATED CASE

This is a continuation application of my commonly assigned copending United States application Ser. No. 867,968, filed Jan. 9, 1978. The assignee of this application also is the record owner of a further application in the field of pallet changers, namely United States application Ser. No. 940,775, filed Sept. 8, 1978.

BACKGROUND OF THE INVENTION

The present invention relates to a new and improved pallet changer having additional distribution and storage functions for fabrication installations or manufacturing plants equipped with a central control station, transfer stations at the conveyor or storage part of the system and address readers, and of the type possessing a rotatable part which can be rotated about a vertical axis and equipped with pallet guides and pallet feed or displacement devices for pallets having switching markers.

In heretofore known manufacturing installations equipped with conveyor lines the workpieces are clamped in a clamping zone upon pallets and successively transported at the conveyor line to one, several or all machines. Operatively associated with each machine is a pallet changer having two change positions and a transfer station at the conveyor line. The pallet changers usually possess a rotatable part which can be rotated through an angle of 180° and having two pallet support guides and associated pallet feed or displacement devices. After a pallet has moved through the part of the conveyor line or path at the side of the machine, then it is either transported to the clamping zone or returned back to the start of the conveyor line. This pallet circulation is accomplished for such length of time until the pallet changer is free at the machine indicated by the central control station. The workpiece which has been finished at a machine is then reintroduced back into the conveyor line by means of the transfer station which is usually rotatable through an angle of 90°. The effectiveness of the conveyor line or path as a storage is limited, since the total number of the pallets which can be received by the conveyor line is limited. Additionally, the pallets dam-up in front of the transfer stations and hinder one another, partially because of the return movement. The desired flexible charging of the machines with different types of workpieces and with priority workpieces is likewise unsatisfactory.

A somewhat improved effectiveness of the conveyor line is obtained by the provision of additional transverse conveyors, a primary conveyor loop being guided about the machines, which are arranged at the transverse conveyors. The pallet outfed by each machine through the action of a second transfer station associated therewith generally brings about a somewhat lesser damming-up of the pallets throughout the entire operation of the installation. The drawbacks attendant with such arrangement reside in increased equipment expenditure and cost owing to the need to provide additional transverse conveyors and transfer stations, and further, the impaired accessibility to the machines and pallet changers.

Furthermore, it is already known in this field of technology to design the conveyor path or line to possess a circular configuration. By means of a pallet changer located at the clamping and unclamping zone or station, it is possible to charge and unload a circular conveyor. Each machine has operatively associated therewith a further pallet changer which coacts with the circular conveyor. The expenditure constituted by three pallet changers and a circular conveyor is extremely high in order to, for instance, interlink two machines.

Now in German patent publication No. 24 35 622 there is described a fabrication installation having, apart from infeeding and return feeding primary conveyor paths or lines, an additional buffer conveyor line or path arranged along all of the erected machines parallel to the main or primary conveyor line. This prior art publication further discloses a technique of controlling priority pallets and routine pallets in conjunction with the buffer conveyor line, as well as the checking of the destination with the selection of the machines. This proposal for a flexible fabrication installation for small, suspended transportable pallets, however cannot be employed at conveyor or conveying lines for supported transportable heavy pallets.

In the case of fabrication installations having a pallet conveyor or feed device which travels upon rails, and which by elevationally adjusting its pallet support can service a shelf storage having large storage capacity, likewise requires for each machine a pallet changer having two change positions and a transfer station at the shelf storage (see the publication Werkstatt und Betrieb 107 (1974/8)). The pallet feed or conveyor device coacts with the clamping and unclamping zone, the shelf storage and the transfer stations in the shelf storage. Due to this arrangement there is afforded a flexible pallet flow, since priority workpieces can be directly inserted for machining. The pallet changers which are employed with such installation for larger sized pallets do not possess any storage capacity, so that particularly when used with manufacturing or fabrication installations having a multiplicity of installed machines, it is possible for the pallet feed device to become easily overloaded if at one or a number of machines there is only carried out an extremely brief amount of work at a workpiece, for instance post-finishing work and, consequently, there can occur standstill times.

Other fabrication installations having a pallet feed or conveyor device for small pallets and workpieces transported in containers, do not have this drawback, because between the transfer station of the shelf storage and the machine there is provided a combined buffer, charging and cleaning station, where the pallets are moved in a number of horizontal planes. The construction of such station is, however, not suitable for large pallets and cannot solve the objectives to which the present invention addresses itself.

SUMMARY OF THE INVENTION

Therefore, with the foregoing in mind, it is a primary object of the present invention to provide a new and improved pallet changer which, especially for larger sized pallets in fabrication plants or installations, renders possible improved and more flexible, i.e. accommodatable, transport paths, and storage capacities.

Yet another important object of the present invention concerns a new and improved pallet changer for a manufacturing plant, which is relatively simple in construction and design, extremely reliable in operation, economical to manufacture and operate, and not associated with the aforementioned drawbacks and limitations of the prior art proposals.

Now in order to implement these and still further objects of the invention, which will become more readily apparent as the description proceeds, the arrangement of the present invention contemplates that the rotatable part is rotatable into four fixed change positions spaced through about 90° from one another for changing the pallets at one, two or three transfer stations and at one or two machine tools. Rotation of the rotatable part is accomplished as a funtion of a program infed to the central control station and by the action of four address readers which are arranged to be non-rotatable, positioned at a spacing of 90° with respect to one another and having the same distance from the axis of rotation, the address readers being activated by address switching markers of the pallets which are pushed onto the pallet guides.

At the underside of the rotatable part there are arranged at four locations disposed in a horizontal plane, offset relative to one another through 90° and concentric to the axis of rotation, at least one respective rotation switching marker which cooperates with a signal transmitter fixed at the socket or base of the pallet changer, this signal transmitter being operatively connected with the central control station. The rotatable part is preferably formed of a square intermediate or central part, at the four vertical outer surfaces of which there is threadably connected or otherwise suitably affixed a pallet support having a pallet guide and a pallet feed or displacement device.

In a variant embodiment an insert-pallet support having threaded connecting surfaces machined thereat is threadably connected at each two oppositely situated, vertical outer surfaces of two pallet supports in such a manner that the total of eight pallet guides are disposed in a horizontal plane at an angle of 45° with respect to one another, and eight storage readers are arranged at a star device upon an axial sleeve.

The storage readers cooperate with storage switching markers located at the end face or side of each pallet located opposite the address switching markers.

The pallet changer of the present invention has the following advantages:

(a) Possible pallet change operations can be accomplished, on the one hand, at one, two or three transfer stations of the conveyor and storage part, respectively, of the fabrication installation, and, on the other hand, at one or two machine tools.

Due to such there are achieved the following results:
(i) increased flexibility during pallet transport, so that priority workpieces can be directly inserted for machining, with possible additional coaction with a rotatable storage;
(ii) reduced mutual hindering of the pallets during transport at the conveyor paths or lines;
(iii) possibility of erecting different fabrication installations by means of a universally employable compact structural unit having advantages during the planning and operation.

(b) Storage capacity when cooperating with a machine in the preferred embodiment having four pallet supports.

(c) Charging of two machines by means of only one pallet changer and one transfer station.

(d) Modular construction for erecting rotatable storages having relatively large storage capacity with cost-favorable production.

(e) Continuous site monitoring of the pallets at the central control station by means of the switching markers, signal transmitter, storage and address readers provided for the cyclic functions.

(f) Good accessibility to the machines, pallet changers and pallet rotary storages.

(g) Lower spatial requirements in relation to the number of pallets which can be received by the fabrication installation.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
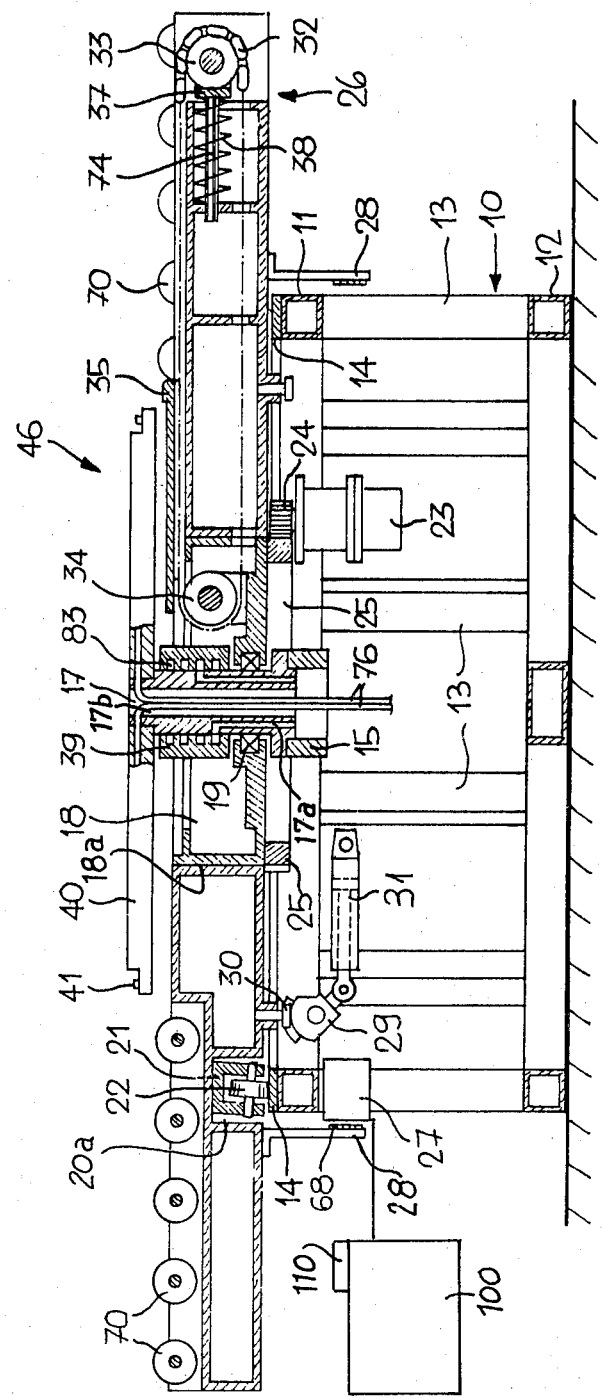
FIG. 1 is a vertical sectional view through a pallet changer, taken substantially along the line I—I of FIG. 2.
Figure 3:
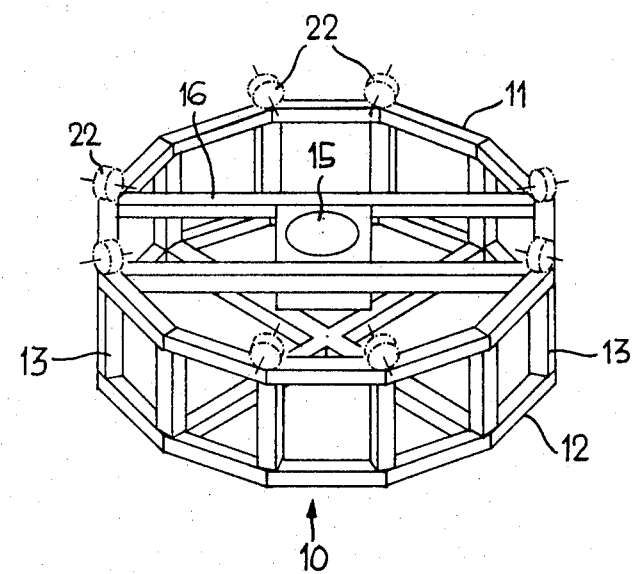
FIG. 3 is a perspective view of part of the pallet changer shown in FIGS. 1 and 2.

Describing now the drawings, according to the showing of FIGS. 1 and 3 the exemplary embodiment of pallet changer 46 shown therein will be seen to comprise a socket or base 10 having an upper and a lower twelve-cornered ring 11 and 12 respectively. Both of these rings 11 and 12 are connected with one another by twelve supports 13. Arranged upon the upper ring 11 is a substantially ring-shaped support track formed of hardened plates 14, upon which there can rotate a rotary or rotatable part 26. At the center of the socket or base 10 there is arranged a hub 15 which is secured by horizontal struts 16 or the like at the socket or base 10. At this hub 15 there is attached an axial sleeve 17 which defines the axis of rotation, and about which the rotary part 26 can rotate.

Figure 2:
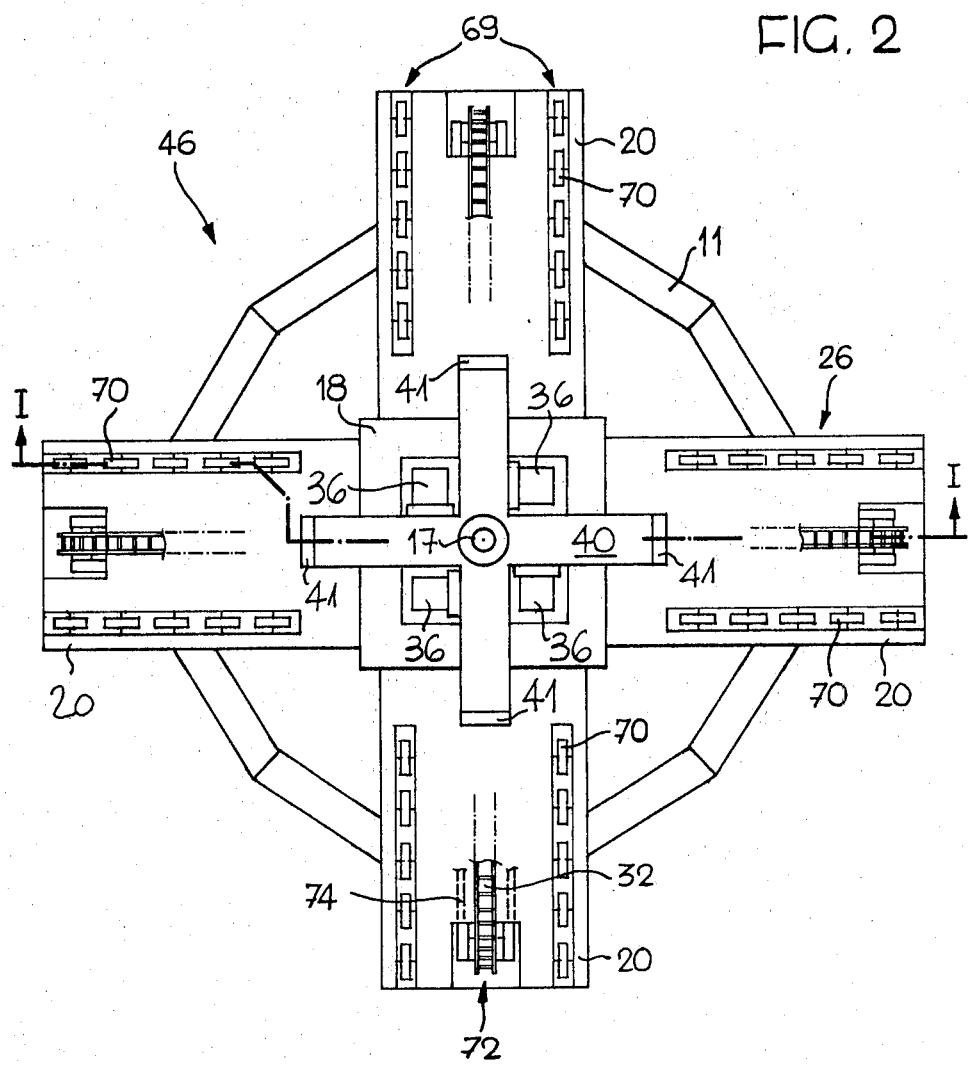
FIG. 2 is a top view of the pallet changer illustrated in FIG. 1.

According to the showing of FIGS. 1 and 2, the rotary part 26 embodies a square or quadratic central or intermediate portion or part 18, which with the aid of ball bearings 19 or equivalent structure, is rotatably centered by means of the axial sleeve or bushing 17. At the four walls 18a of the square intermediate part 18 there are attached four pallet supports or carriers 20. Each pallet support 20 comprises two recesses 20a in which there are secured the bearing blocks 21. In the bearing blocks 21 there are supported cone-shaped support rolls 22 which brace the rotary part 26 upon the hardened plates 14 of the ring-shaped roller track. In the change positions of the rotary part 26, the eight support rolls 22 are located exactly over the eight vertical supports 13, as such has been best illustrated in FIG. 3, whereby there is ensured for great rigidity, with relatively modest expenditure of material.

In order to drive the rotary part 26 there is attached at the base 10 a hydromotor 23 or other suitable drive, the pinion 24 of which meshes with a crown gear or toothed wheel rim 25 secured at the intermediate or central part 18. To control the rotation of the rotary part 26 a signal transmitter 27 is attached at the base 10, signal transmitter 27 being operatively connected with the here not further shown central control station, generally indicated by reference character 100. Further, attached at the underside of the pallet supports 20 are four holders 28, each having a respective rotation switching marker 68 or the like and offset through an angle of 90° with respect to one another. In conjunction with the program infed to the central control station 100 and the signals of the hereinafter to be described address readers, such markers 68 enable accomplishment of the required rotation of the rotary part 26 into four change positions fixed relative to one another through an angle of 90°, by means of a counter 110 effective at the central control station. To provide exact indexing to the change positions a curved roll or cam 29 having a horizontal axis is pivotably mounted at the base 10. This curved roll or cam 29 cooperates with four indexing rolls 30 arranged offset through 90° with respect to one another at the underside of the rotary part 26. The pivotable movement of the curved roll or cam 29 is accomplished by a pivoting cylinder unit 31.

Now as best seen by referring to FIG. 2, there is arranged upon each pallet support or carrier 20 a pallet guide or guide means 69 formed by two rows of traveling rolls 70. For displacing the chain-dot illustrated pallet 71 (FIG. 5) upon the pallet guide 69 there is provided a respective pallet feed or displacement device 72. It consists of an endless chain 32 (FIG. 1), which is driven and guided by two sprocket wheels 33 and 34. Attached to the chain 32 is a pallet thrust or feed rod 35 cooperating with the pallet pawls 73 (FIG. 5), and apart from the pallet feed operation also serves for arresting the pallets. The inner sprocket wheel 34 shown in FIG. 1 is driven by a hydromotor 36 or other suitable drive which has been shown in FIG. 2. The outer sprocket wheel 33 is mounted in a roller bracket or block 37, which for achieving the requisite pre-tensioning of the chain 32 is supported by means of its guide shaft 74 and the package of plate springs 38 at the pallet support 20 and at the roller block 37.

Now in order to supply pressurized fluid medium to the hydromotors 36 from a not particularly illustrated but conventional hydraulic system which is arranged within the socket or base 10, there is provided the infeed bushing or sleeve 39 which is rotatably mounted upon the axial sleeve 17. The pressurized medium is delivered in conventional manner from eight bores 17a located in the wall of the axial sleeve 17 through ring-shaped or angular grooves 83 of the infeed bushing 39 and from that location to the four hydromotors 36, which for the purpose of driving them in both rotational directions require a total of eight conduits or lines.

As best seen by referring to FIG. 2, at the upper end of the axial sleeve 17 there is attached a cross-like member 40, at the four ends 40a of which there are arranged four address readers 41 having the same spacing from the axis of the axial sleeve 17, the arrangement being accomplished in such a manner that these address readers 41 are acted upon by the address switching markers 75 located at the pallets 71 (FIG. 5) whenever a pallet has been shifted by the pallet feed or displacement device 72 into its corresponding terminal position at the pallet guides 69. Additionally, there are provided at the cross-like or cross member 40, not particularly illustrated switching elements for controlling the pallet feed device 72. The address readers 41 and the switching elements are connected by the lines 76, which are fixed in position by the concentric bore 17b of the axial sleeve 17, with the central control station and the hydraulic installation located in the base 10.

Figure 4:
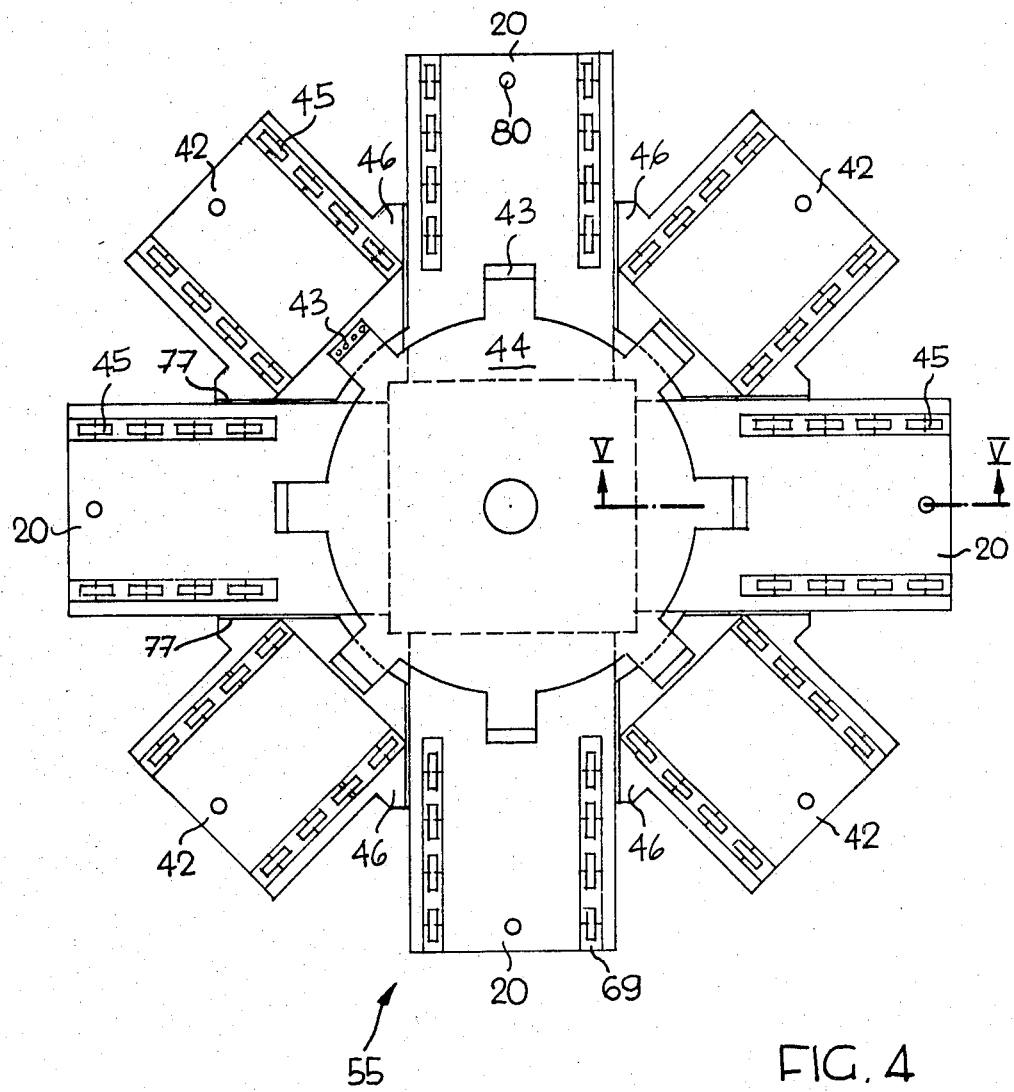
FIG. 4 is a top plan view of a rotary storage.

Now in FIG. 4 there is illustrated a rotary storage 55. For constructing such into a modular system there are dispensed with, in comparison to the pallet changer, the four pallet feed devices 72 and the cross-like or cross member 40, whereas all of the remaining components of the prior discussed embodiment are here also present. From the showing of FIG. 4 it will be seen that the rotary part 26 with the four pallet supports 20 of the pallet changer is augmented by four insert-pallet supports 42. These insert-pallet supports 42 are threadably connected by means of their two thread connecting surfaces 77 arranged symmetrically with respect to the pallet guide 69 and at right angles to one another at two respective oppositely situated, vertical outer surfaces of two pallet supports 20. Also at the underside of each insert-pallet support 42 there are mounted two respective conical support rolls 22 (FIG. 1) and a respective indexing roll 30, and there is also arranged a holder 28 having a rotation switching marker 68 or equivalent structure, which together with the signal transmitter 27 serves for indexing each pallet guide 69 into four transfer stations 78 (FIG. 7), fixed at an angle of 90° with respect to one another. For this purpose there are additionally arranged at the pallets 71 (FIG. 5) to be stored upon the rotary storage 55, the storage switching marker 79 at the second end face or side opposite the address switching marker 75. These storage switching markers 79 cooperate with eight storage readers 43 which are arranged similar to the case of the pallet changer at a star arrangement 44 at the same spacing from the axial sleeve 17.

Figure 5:
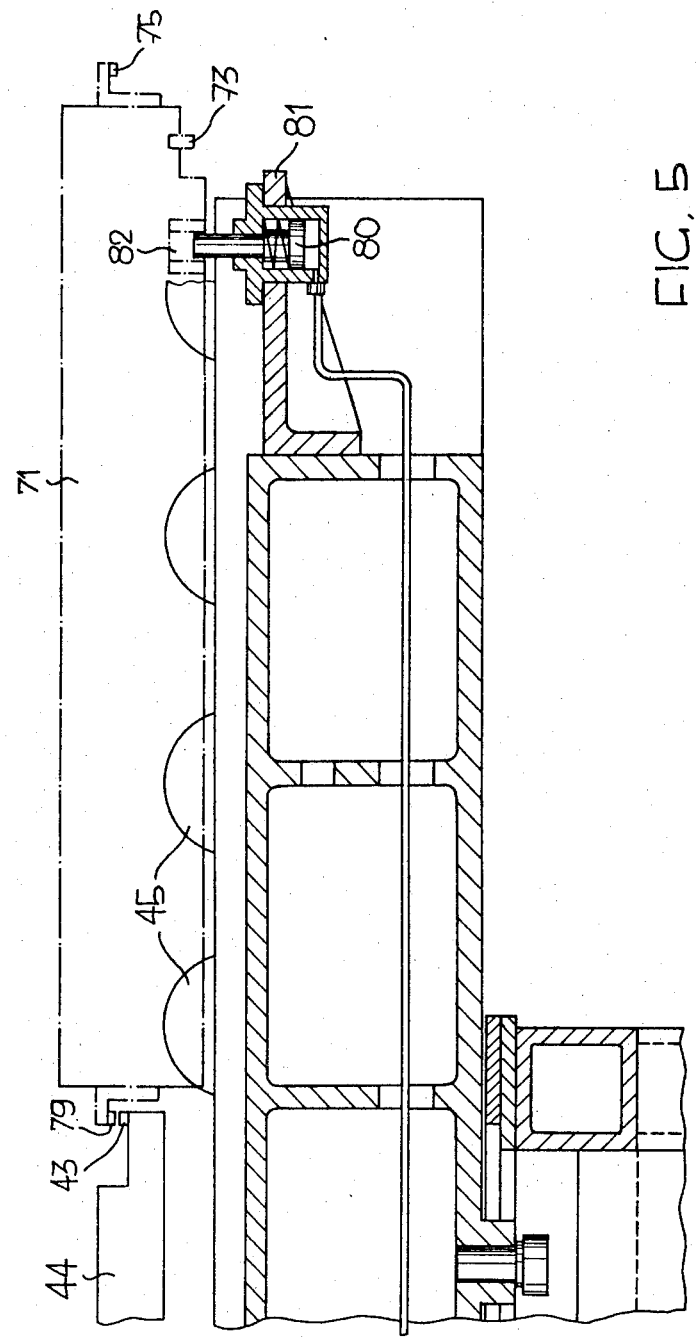
FIG. 5 is a vertical partial sectional view, taken substantially along the line V—V of FIG. 4.

As best seen by referring to FIG. 5, for mounting the pallets there is arranged at the outer ends of each pallet support, instead of the roller bracket or block 37, a thrust piston 80 by means of a block 81, the free end of which in the ejected position when such thrust piston 80 is impinged with pressurized oil or other suitable pressurized fluid medium, engages into a bore 82 of the pallet 72 and arrests such at the pallet guide 69 with the support rolls 45. All eight provided thrust pistons 80 can be impinged with the pressurized fluid medium by the infeed bushing 39 independently of one another, and upon switching the system to the return flow of the oil they release under spring pressure the pallets 71 prior to the pallet change.

The use of the pallet changer and the rotary storage in the manufacturing or fabrication installations for different production requirements will be apparent from the showing of FIGS. 6–11.

Figure 6:
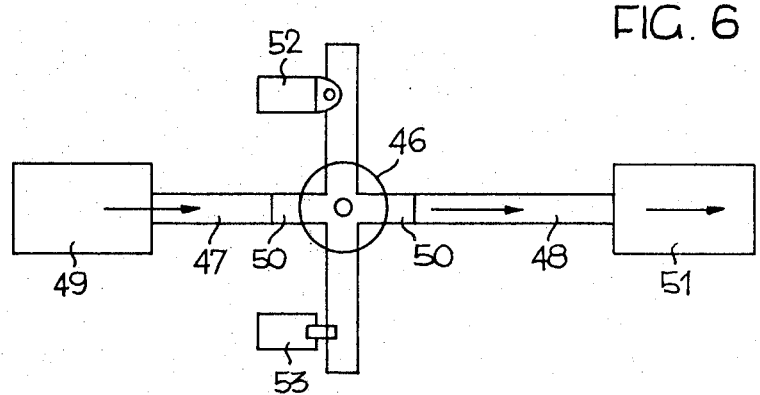
FIG. 6 illustrates the use of a pallet changer having two machine tools and a conveyor line or path.

Now according to the showing of FIG. 6, a pallet changer 46 is arranged between two conveyor path or track sections 47, 48 and the pallets 71 are transported out of the clamping zone or station 49 in conventional manner in the direction of the indicated arrow. At the end of the conveyor track or line section 47 there is located a transfer station 50, from which the pallet changer 46 either delivers the pallets 71 to the vertical machine 52 or the horizontal machine 53 and assumes the transfer from one to the other machine. After completion of the working operations the pallet changer 46 shifts the pallets 71 to the transfer station 50 located at the start of the conveyor track section 48, from which location they are transported in conventional manner to the unclamping zone or station 51. In this case change operations are thus carried out, on the one hand, at two transfer stations 50 of the conveyor part of the fabrication installation and, on the other hand, at two machine tools 52 and 53, the transfer stations 50 simply constituting end parts of the conveyor tracks or lines 47 and 48.

Figure 7:
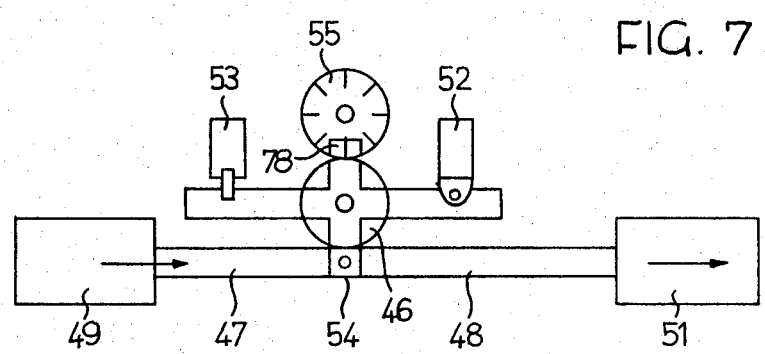
FIG. 7 illustrates the use of a pallet changer and a rotary storage with two machine tools and a conveyor path or line.

According to the showing of FIG. 7 the pallet changer 46 is arranged between a vertical machine 52, a horizontal machine 53 and a rotary storage 55, adjacent the conveyor line or lines 47, 48. Between both of the conveyor track or line sections 47 and 48 there is provided as usual a transfer station 54 rotatable through 90°, and the transfer station 54 is located opposite a transfer station 78 of the rotary storage 55.

This rotary or rotational storage 55 in this case thus renders possible an increased flexibility of the fabrication installation in that upon arrival of priority workpieces or the need to carry out certain necessary post-machining work of an earlier factory order, the conveyor track section 47 and the pallet changer 46 can be freed of the normal or routine pallets in that the pallet changer transfers such to the rotary storage 55, whereby the fabrication installation is immediately ready for receiving the workpieces to be machined with priority.

The rotary storage also can be advantageously employed for the storage of routine or ordinary workpieces, in order to compensate different machining times at the machines, or in order to render superfluous a continual mode of operation in the clamping zone which, as is known, is accomplished manually.

With this fabrication installation there are thus carried out by a pallet changer change operations at a transfer station 78 of the rotary storage, a transfer station 54 rotatable through 90°, a conveyor track or path and at two machines 52 and 53.

Figure 8:
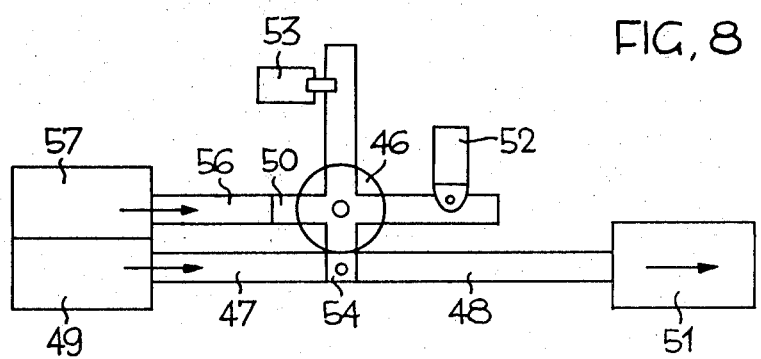
FIG. 8 illustrates the use of a pallet changer having two machine tools and two conveyor paths or lines.

According to the showing of FIG. 8, the pallet changer 46 interlinks two machine tools 52 and 53 with a conveyor track or line 47, 48 and a second conveyor line or track 56, wherein for each conveyor line or track 47, 48 and 56, there is provided a clamping station or zone 49, 57 and a common unclamping zone or station 51. Reference character 54 designates the conventional rotatable transfer station at the first conveyor track or line 47, 48 and reference character 50 designates the simple transfer station of the second conveyor line or track 56 and which station is constructed as a terminal or end part. This arrangement is then advantageous if there are to be machined different types of workpieces at different priorities.

In this case, there are carried out by a pallet changer 46 change operations at a transfer station 50 constructed as a simple terminal part of a conveyor line or track, a transfer station 54 rotatable through 90°, and at two machine tools.

Figure 9:
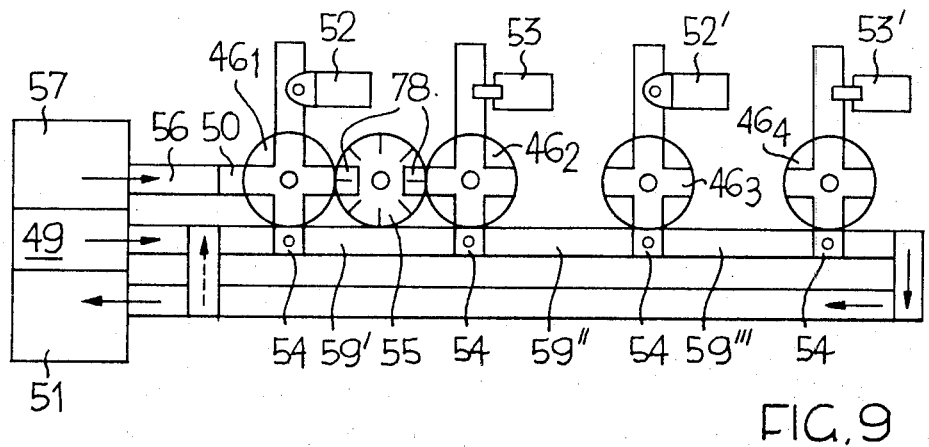
FIG. 9 illustrates the use of four pallet changers, a rotary storage, four machine tools, and two conveyor paths or lines.

With the manufacturing or fabrication installation shown in FIG. 9, each of the four machines 52, 53, 52' and 53', has operatively associated therewith a pallet changer $46_1$, $46_2$, $46_3$, and $46_4$, respectively. These pallet changers, collectively designated by reference character 46, are located at a primary or main conveyor line 59, 59', 59'', 59''', 60, constructed in the form of a loop where there are arranged four transfer stations 54 rotatable through 90°. Since both of the first machines 52, 53—a horizontal machine and a vertical machine—are provided for carrying out supplementary operational work, there is arranged between their pallet changers $46_1$, $46_2$ a rotary storage 55 cooperating with these pallet changers $46_1$, $46_2$ and directly transports workpieces from the horizontal machine 53 to the vertical machine 52. In this way, the primary conveyor line 60 is relieved and the installation is rendered more operationally flexible. This flexibility is even further augmented by the additional clamping station or zone for priority workpieces 57 and the priority conveyor line 56 with its transfer station 50. What is also favorable for the course of operation of such fabrication installation is the fact that there is provided a certain buffer capacity for both of the last machines 52', 53' due to the pallet changer 46 having four respective pallet supports 20.

With this installation there are carried out by the first pallet changer $46_1$ change operations at three transfer stations 50, 54, 78 and at a machine tool 52. The second pallet changer $46_2$ carries out change operations at two transfer stations 54, 78 and a machine tool 53, whereas both of the last pallet changers $46_3$, $46_4$, with the available buffer capacity, carry out change operations at a respective transfer station 54 and at a respective machine tool 52', 53'.

Figure 10:
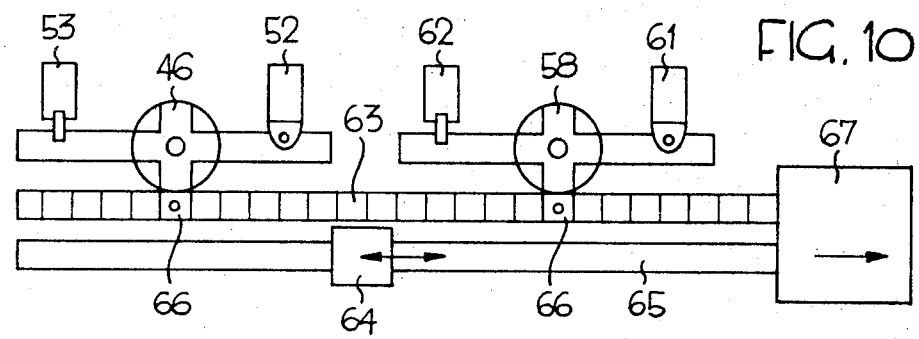
FIG. 10 illustrates the use of two pallet changers, four machine tools, and a pallet conveyor device.

Now in the showing of FIG. 10 there is arranged a first pallet changer 46 between a first vertical machine 52 and a first horizontal machine 53 and apart from the foregoing a second pallet changer 58 is arranged between a second vertical machine 61 and a second horizontal machine 62. Adjacent both of the pallet changers 46 and 58 there is located a stationary shelf storage 63 as well as a pallet feed device 64. The pallet feed device 64 can be shifted upon the rail 65 between the clamping and unclamping station 67 and the shelf storage 63. This shelf storage 63 possesses two transfer stations 66, from which there are distributed to two respective machines the pallets by the pallet changer. In this fabrication installation there are carried out by a pallet changer change operations at a transfer station 66 and two machine tools.

Figure 11:
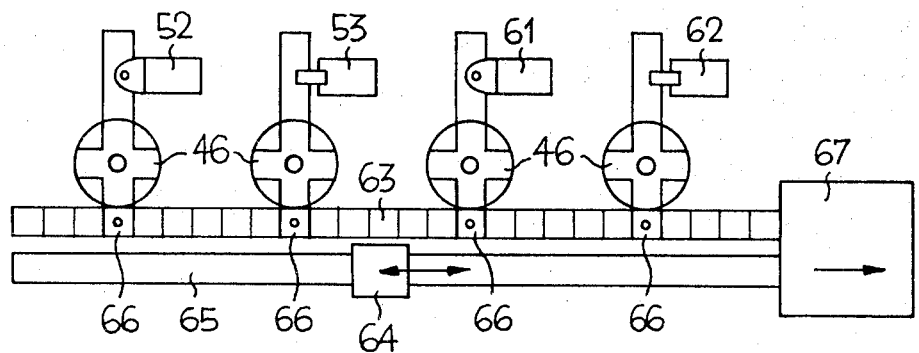
FIG. 11 illustrates the use of four pallet changers, four machine tools, and a pallet feed or conveyor device.

According to the showing of FIG. 11 there are provided four pallet changers 46 adjacent the stationary shelf storage 63 and a pallet feed or displacement device 64 which can be displaced upon rail 65 analogous to the arrangement discussed above in conjunction with FIG. 10. Each pallet changer 46 has operatively associated therewith either a vertical machine 52 and 61 or a horizontal machine 53 and 62. In this case, the pallet changer 46, due to its four pallet supports 20, additionally acts as a buffer so that there is eliminated any overloading of the pallet feed device 64. Here, pallet change operations are accomplished respectively at a machine and a transfer station.

While there are shown and described present preferred embodiments of the invention, it is to be distinctly understood that the invention is not limited thereto, but may be otherwise variously embodied and practiced within the scope of the following claims.
ACCORDINGLY,
What I claim is:

1. A transfer apparatus, comprising:
   support hub means having at least four non-rotating members;
   rotating part means being rotatably mounted and extending radially outward from said support hub means;
   said rotating part means comprising means for supporting pallets and having pallet guide means;
   means for feeding pallets along said pallet supporting means;
   address reading means mounted on each of said at least four members, said address reading means being mounted adjacent to the ends of said pallet supporting means nearest the support hub means; and
   marking means attached to said pallets for activating said address reading means once said pallets are on said pallet supporting means such that pallets are fed to predetermined locations.

2. The apparatus of claim 1, wherein:
   said address reading means are concentrically arranged with respect to the axis of rotation of said rotating part means and offset through an angle of 90° with respect to one another.

3. The apparatus of claim 1, wherein:
   said rotary part means comprises:
   a quadratic central portion having four essentially vertical outer surfaces;
   said pallet supporting means and said pallet guide means being connected at said four vertical outer surfaces; and
   drive means mounted at said central portion for rotating said rotary part means.

4. The apparatus of claim 3, wherein:
   said support hub means further includes an axial sleeve mounted therein and about which said rotary part means can rotate.

5. The apparatus of claim 4, further including:
   means for infeeding pressurized oil to said drive means; and
   an infeed bushing rotatable with said rotary part means upon said axial sleeve, wherein said infeed oil means includes eight oil bores at a wall of said axial sleeve opening into said infeed bushing.

6. The apparatus of claim 4, wherein:
   said axial sleeve has a concentric base.

7. The apparatus of claim 6, wherein:
   said address readers have signal lines extending through said concentric base of said axial sleeve.

8. A fabrication installation for storing pallets comprising:
   support hub means;
   rotary part means, being rotatably mounted about an axis and extending radially outward from said support hub means including a plurality of pallet support means each having an outer end;
   each two pallet support means having two respective oppositely situated vertical surfaces;
   axial sleeve means cooperating with said rotary part means and being mounted at said support hub means;
   pallet guide means mounted on said pallet support means;
   insert-pallet support means connected at each of said two oppositely situated surfaces;
   said insert-pallet support means having two connecting surfaces machined symmetrically and at right angles to one another with respect to said pallet guide means;
   there being provided eight said pallet guide means in a substantially horizontal plane disposed at an angle of about 45° with respect to one another;
   a star member arranged upon said axial sleeve means;
   eight address reading means mounted at said star member;
   said rotary part means has an underside;
   a plurality of substantially vertical rotation switching markers disposed in a substantially horizontal plane and located at said underside of said rotary part means; and
   said plurality of rotation switching markers being concentrically arranged about said axis of rotation and offset from one another through an angle of 45°.

9. The apparatus of claim 8, wherein:
   said pallets to be stored include marking means arranged thereon for activating said address reading means.

10. The apparatus of claim 8, further including:
    a plurality of thrust piston means each arranged at an outer end of said pallet support means for locking an associated pallet on said pallet support means.

11. The apparatus of claim 10, wherein:
    each of said plurality of thrust piston means includes oil bores and an infeed housing such that each thrust piston means may be independently activated.

12. The apparatus of claim 8, wherein:
    each of said pallet support means has an underside having two recesses;
    substantially conical-shaped support rolls are mounted in said recesses;
    a substantially ring-shaped support track formed of plates concentrically arranged with respect to said axial sleeve means; and
    said support rolls roll upon said substantially ring-shaped support track when said rotary part means rotates.

13. The apparatus of claim 8, further including:
    a base for supporting said rotary part means;
    said rotary part means has an underside;
    a plurality of indexing rolls arranged at the underside of said rotary part means;
    said indexing rolls having vertical axes arranged at a circle at a predetermined angle from one another;
    said circle being substantially concentrically disposed with respect to said axial sleeve means;
    cam roll means which cooperate with said indexing rolls;
    said cam roll means having a substantially horizontal pivot axis and being stationarily mounted in the base; and
    a pivot cylinder unit for pivoting said cam roll means.

14. The apparatus of claim 13, wherein:
    there are provided four of said indexing rolls which are spaced from one another through an angle of 90°.

15. The apparatus of claim 13, wherein:
    there are provided eight of said indexing rolls which are spaced at an angle of 45° from one another.

16. The transfer apparatus of claim 1, further including:
    each pallet supporting means having a pallet guide and a pallet feeding device for shifting said pallets;
    said marking means are address switching markers;

said four address readers for reading addresses on said pallets are non-rotatably fixed at substantially the same spacing from said axis of rotation and are offset from one another through an angle of about 90°; and means for rotating said rotating part by imparting rotational movement thereto through four fixed pallet change positions which are offset from one another through about 90° for permitting a pallet to be transferred by the pallet feeding device to and from the machine tools.

* * * * *